June 20, 1961 R. W. TACCONE 2,988,789
DIAPHRAGM MOLDING MACHINE HAVING A MOVABLE HEAD
Filed Oct. 17, 1958 3 Sheets-Sheet 1

INVENTOR.
Russell W Taccone
BY
Charles L. Lovercheck
attorney

June 20, 1961 R. W. TACCONE 2,988,789
DIAPHRAGM MOLDING MACHINE HAVING A MOVABLE HEAD
Filed Oct. 17, 1958 3 Sheets-Sheet 2

INVENTOR.
Russell W Taccone
BY
Charles L. Loverback
attorney

INVENTOR.
Russell W Taccone
BY
Charles L. Lovenbach
attorney

United States Patent Office 2,988,789
Patented June 20, 1961

2,988,789
DIAPHRAGM MOLDING MACHINE HAVING A MOVABLE HEAD
Russell W. Taccone, Erie, Pa., assignor to Taccone Pneumatic Foundry Equipment Corporation, Erie, Pa., a corporation of Pennsylvania
Filed Oct. 17, 1958, Ser. No. 767,877
3 Claims. (Cl. 22—40)

This invention relates to molding machines and, more particularly, to the type of molding machines known as diaphragm molding machines.

In molding machines of this type made according to previous designs, one of which is shown in Patent No. 2,698,976, a molding machine is shown having a downwardly opening head with a diaphragm across the head and a support for a flask under the head. When the flask is moved to a position under the cavity in the head with sand therein, the diaphram may be forced down into molding engagement with the sand to compress the sand. In the present design, the machine is made in such a way that the flask is filled with sand after the flask is in molding position. The head is then moved into position over the sand and compressed air is then applied to compress the sand.

This has numerous advantages over prior machines, one of the advantages being that in the present machine, the flask can be filled while it is in position over the pattern plate. Therefore, the pattern plate does not have to be removed but can remain in position under the loading device at all times, the head alone being moved along with the flasks which are moved in and out for loading.

It is, accordingly, an object of this invention to provide an improved loading and molding machine.

Another object of the invention is to provide an improved molding machine.

A further object of the invention is to provide a molding machine wherein the flask may be filled while it is in the position in which the sand is to be compressed and a compressing means can be moved over the sand and the flask after the flask is filled.

A still further object of the invention is to provide a machine for molding green sand which is simple in construction, economical to manufacture, and simple and efficient to use.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

Figure 1:
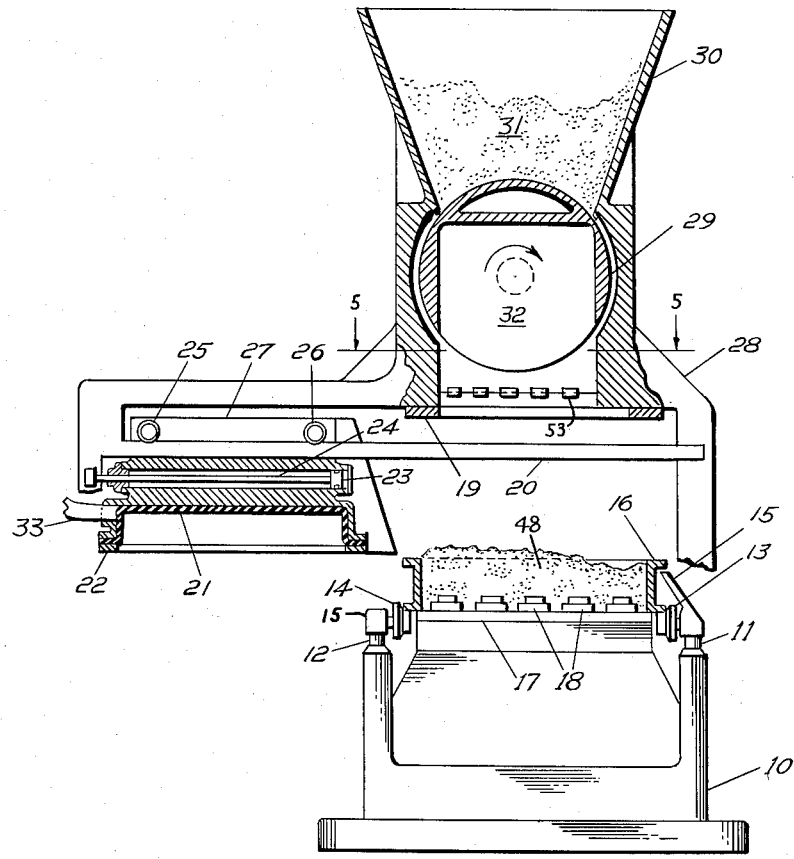
FIG. 1 is a longitudinal cross sectional view of a machine according to the invention with the sand placed in the flask prior to molding.
Figure 5:
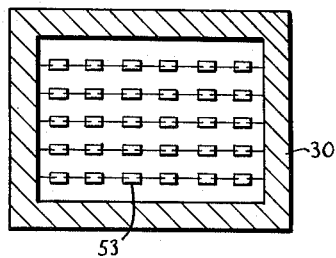
FIG. 5 is a cross sectional view taken on line 5—5 of FIG. 1.

Now with more specific reference to the drawings, a molding machine is shown having a base 10 with a lifting mechanism thereon made up of a hydraulic piston and cylinder arrangement 49 and 50 with the piston rods of the pistons connected to lifting members 11 and 12. To the upper end of the lifting mechanism are attached wheels 13 and 14 which are attached to axles. The axles are in turn attached to brackets 15 which are in turn attached to the upper ends of the lifting members 11 and 12.

Figure 2:
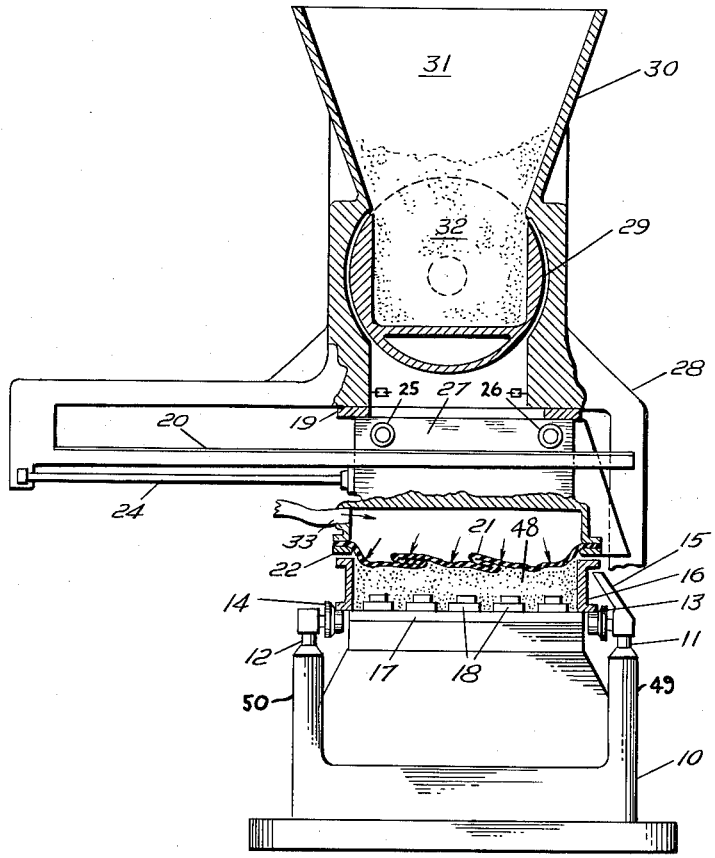
FIG. 2 is a view similar to FIG. 1 of the machine with the molding head in position over the flask and the diaphragm in compressing position.

A flask 16 is shown having its lower flanges 37 and 38 supported on the wheels 13 and 14, respectively, whereby it can be lifted from a pattern plate 17 to bring it up into engagement with the underside of the flask 16 as shown in FIG. 2 in molding position or wherein it can be lowered away from the flask 16 to the position shown in FIG. 1. The sand in the mold is indicated at 48. In FIG. 1, the sand 48 is in loose condition; it is in a position being packed in FIG. 2; and in FIG. 3, the sand 48 is completed and the head moved away from over the sand 48. When the flask 16 is in the position shown in FIG. 2, it rests on the pattern plate 17 around the peripheral edges thereof and sand from a sand loader 29 can be deposited thereinto when the head is moved to the position shown in FIG. 1.

The sand loader 29 is made up of a drum rotatable about an axle 39 in the direction of the arrow in FIG. 1 and has a cavity 32 therein. The axle 39 is supported on the sides of the frame of the machine indicated at 28 and when in the position shown in FIG. 3, sand 31 from a hopper 30 will be deposited in the loader 29. Then when the sand loader drum 29 is rotated on its axle 39 to the position shown in FIG. 1, sand which is trapped in the sand loader drum 29 will be dropped down through a passage 40 into the flask 16 as shown in FIG. 1. A frame 19 is disposed around the lower side of the passage 40 and provides a back-up to prevent upward movement of a head 27 when air pressure is applied behind a diaphragm 21 when the diaphragm 21 engages the sand 48. The sand loader drum 29 can then be rotated to the position shown in FIG. 3 wherein another amount of sand 31 will be deposited in the sand loader 29.

The pattern plate 17 has patterns 18 supported thereon in a conventional manner and the pattern plate 17 is fixed to the machine frame and does not move. The flask 16 is moved on the wheels 13 and 14 into position under the head 27 and over the pattern plate 17. When it is in position under the head 27, the flask 16 is lowered by means of the lifting members 11 and 12 and the cylinders 49 and 50 in the base 10 in a conventional manner.

A track 20 is supported on the machine frame 28 at 41 and 42. A cantilever frame portion 43 extends from the main portion of the frame of the machine in cantilever fashion and is attached thereto at 44. A piston rod 24 is attached to the end of the frame portion and to the cantilever portion 43 of the frame at 45. The piston rod 24 has a piston 23 attached to the distal end thereof and the piston 23 is slidably received in a cylinder 35. The cylinder 35 is a double acting cylinder and is an integral part of the head 27.

Figure 3:
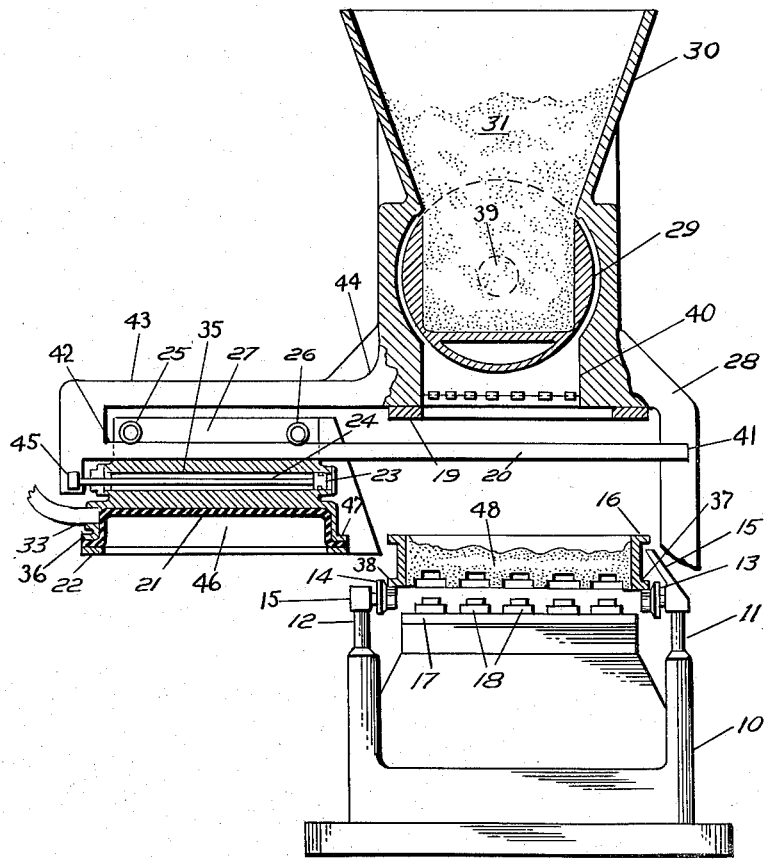
FIG. 3 is a similar view of the same molding machine with the mold completed and stripped off of the pattern plate ready to be pushed out from under the molding head and the head removed therefrom.

When air pressure is put in the cylinder 35 on one side of the piston 23, the head 27 is pushed to the position shown in FIGS. 1 and 3 and when air pressure is put on the other side of the piston 23, the head 27 is pushed to the position shown in FIG. 2. The head 27 has a downwardly facing cavity 46 therein and across this cavity 46 is arranged the diaphragm 21. The diaphragm 21 is held to a lower flange portion 47 on the head 27 by a clamping ring 22 which may be clamped thereto by any suitable clamping arrangement, for example, stud bolts extending through the ring 22 and into the flange portion 47.

A pipe line 33 is attached to the head 27 and it communicates with the cavity in the space therein and above the diaphragm 21 so that when air pressure is applied through the pipe 33 in the manner indicated in Patent 2,698,976 referred to above, the diaphragm 21 is forced down into packing engagement with the sand as shown in FIG. 2 and the machine is so arranged that no air pressure is applied to the diaphragm 21 until the head 27 is in position as shown in FIG. 2 over the flask 16. Then when the sand is packed in the flask 16, a vacuum is applied to the pipe 33. This draws the diaphragm 21 up into the head 27 to the position shown in FIGS. 1 and 3 so that the head 27 can be moved on the track 20 with wheels 25 and 26 rolling thereon to remove the head 27 from under the sand loader 29. The action of the diaphragm 21 is similar to that in the aforementioned patent. After the diaphragm 21 has been moved into the head 27, the lifting members 11 and 12 can be actuated to lift the flask 16 upward to the position shown in FIG. 3 to strip the flask 16 off of the patterns 18. Then the flask 16 with the mold formed therein can be moved on the track 20 out from under the sand loader 29 and the completed mold can be replaced by an empty flask.

Spaced chains 53 have relatively heavy links and are made of steel or some other heavy material and they help distribute the sand evenly in the flask 16 as it falls therethrough. The chains 53 may be supported with a certain amount of slack therein.

Figure 4:
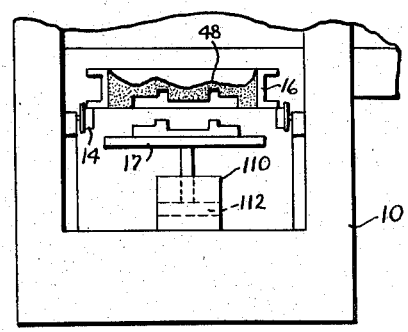
FIG. 4 is a view of another embodiment of the invention.

In the embodiment of the invention shown in FIG. 4, a machine like that in FIG. 1 is shown except that the pattern plate 17 is raised and lowered by a hydraulic cylinder 110 having a piston 112 therein.

The foregoing specification sets forth the invention in its preferred practical forms but it is understood that the structure shown is capable of modification within a range of equivalents without departing from the invention which is to be understood is broadly novel as is commensurate with the appended claims.

The embodiments of the invention in which an exclusive property or privilege is claimed are defined as follows:

1. A molding machine comprising a frame, means to support a pattern plate on said frame, a pattern plate adapted to be supported on said means, a flask around said pattern plate, a sand loader, said sand loader being supported on said frame above and directly vertically over said pattern plate and in spaced relation thereto, a head having a downwardly opening cavity, track means on said frame, means supporting said head on said track means to move said head along said track means over said pattern plate and under said sand loader and to move said head from over said pattern plate, a flexible member attached to said head and extending across said cavity in said head, fluid pressure means connected to said cavity to admit fluid under pressure into said cavity behind said flexible member to force said flexible member into packing engagement with sand adapted to be put in said flask, and lifting means for lifting said flask into sealing engagement with said head.

2. The machine recited in claim 1 wherein spaced chains are disposed below said sand loader whereby sand from said loader engages said chains as it flows into said flask.

3. The machine recited in claim 1 wherein said means for lifting said flask comprises wheel means engaging said flask and hydraulic cylinder means urging said wheel means toward said flask when said head is disposed over said flask.

References Cited in the file of this patent

UNITED STATES PATENTS

| | | |
|---|---|---|
| 1,127,471 | Macdonald | Feb. 9, 1915 |
| 2,588,669 | Taccone | Mar. 11, 1952 |
| 2,613,409 | Miller | Oct. 14, 1952 |
| 2,686,345 | Young | Aug. 17, 1954 |
| 2,847,735 | Butler | Aug. 19, 1958 |
| 2,852,820 | Taccone | Sept. 23, 1958 |

FOREIGN PATENTS

| | | |
|---|---|---|
| 532,544 | Canada | Feb. 6, 1956 |